J. A. B. WILLIAMS.
Assignor to S. S. WHITE.
Tool-Holder.
No. 8,360. Reissued Aug. 6, 1878.
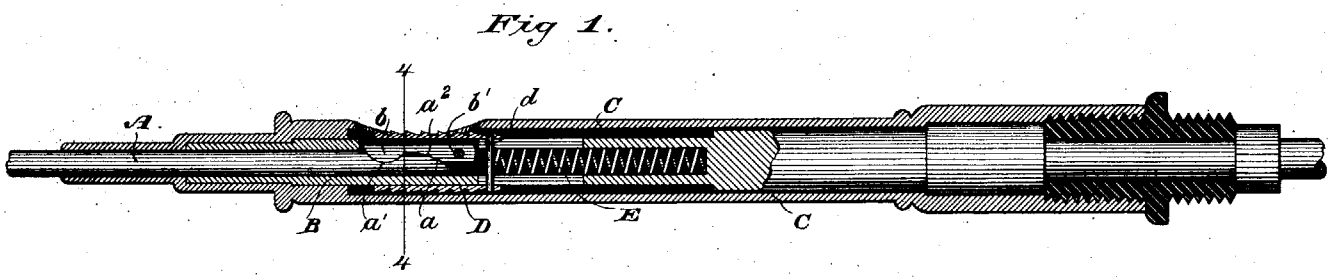
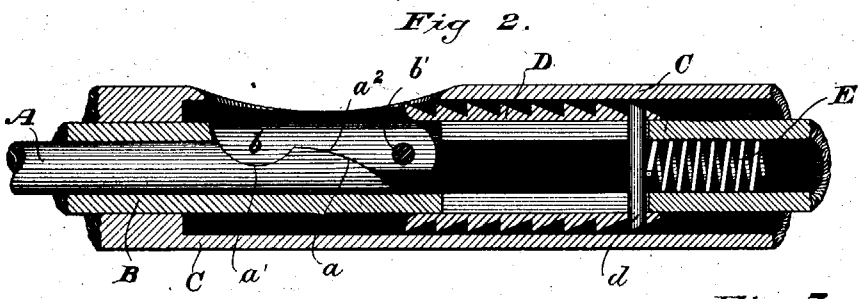
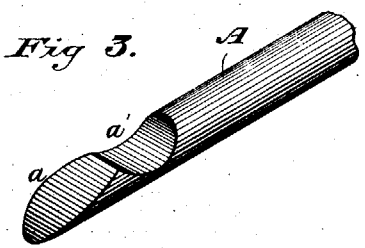
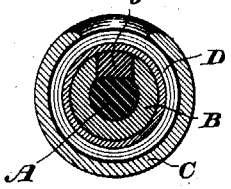
WITNESSES
Wm A Skinkle
Geo W Breck del.
INVENTOR
John A. B. Williams.
By his Attorneys
Baldwin Hopkins & Peyton

UNITED STATES PATENT OFFICE.

JOHN A. B. WILLIAMS, OF PHILADELPHIA, PENNSYLVANIA, ASSIGNOR TO SAMUEL S. WHITE, OF SAME PLACE.

IMPROVEMENT IN TOOL-HOLDERS.

Specification forming part of Letters Patent No. 170,694, dated December 7, 1875; Reissue No. 8,360, dated August 6, 1878; application filed July 10, 1878.

*To all whom it may concern:*

Be it known that I, JOHN A. B. WILLIAMS, of the city and county of Philadelphia, in the State of Pennsylvania, have invented certain new and useful Improvements in Holders for Tools and Implements, of which the following is a specification:

My invention relates to tool-holders of that class which are socketed for the reception of the driving ends of operating tools or implements, and capable of being rotated at a high rate of speed in a suitable handle or casing adapted to be held in the hand of the operator, to guide, control, and direct the tool in its operations.

The prime object of my invention is to enable a tool or implement to be readily inserted into its socket or holder, or removed therefrom, and yet be held securely in the socket, while in operation, and firmly driven.

To these ends my invention consists, first, in combining a casing or handle, a chuck or holder revolving therein, a locking-latch pivoted in the chuck, so as to lock the operating-tools from withdrawal when in operation, and a thimble or sleeve sliding endwise on the chuck, and adapted to hold the pivoted latch in its locking position until the thimble is retracted, which retraction permits the latch to rock upon its pivot and the tool to be inserted or withdrawn; secondly, in combining a rotating socketed chuck, a locking-latch pivoted in a slot therein, a thimble or sleeve sliding endwise on the chuck, and a spring which normally keeps the thimble in its forward position to prevent rocking of the latch and withdrawal of the tool; thirdly, in combining the handle or casing provided with a slot through which access is had to the tool-lock, the slotted socketed chuck revolving in bearings therein, a locking-latch pivoted in the chuck, a thimble or collar sliding on the chuck, and a spring acting on the thimble.

My invention also consists in an improved operating-tool having a round shank, a beveled or tapering driving end or surface, (which enables the tool to be firmly driven and prevents it from turning in the socket of the rotary chuck by engagement with the actuating surface,) and a cross-groove, or one parallel with the face of the driving-surface, formed between the said surface and the round portion of the shank, with which groove it is adapted to engage the tool-locking mechanism of the rotary chuck to prevent withdrawal of the tool.

My invention further consists in combining a beveled-end tool provided with a cross-groove, or one parallel with the beveled portion of the tool, with a socketed holder provided with a locking latch or device acted upon by a spring, and adapted to be operated for the release of the tool from said holder.

In the accompanying drawings, which show my invention as embodied in the best way now known to me, Figure 1 represents a vertical longitudinal central section through the hand-piece of a dental engine embracing my improvements; Fig. 2, a similar enlarged view of a portion of the same; Fig. 3, a view in perspective of the butt-end of the improved tool-shank, showing the beveled driving-surface and cross-groove; and Fig. 4, a transverse section through the instrument on the line *x x* of Fig. 1.

In this instance, the round tool-shank A is shown as constructed with a beveled or tapering end or side, *a*, which constitutes the driving or actuating surface of the tool, and with a notch, recess, or groove, *a'*, running across the beveled surface, or parallel with it, and between said surface and the round portion of the shank. This cross-groove is adapted for the reception or engagement of the tool-locking mechanism of the rotary chuck, to prevent withdrawal of the tool while in operation.

By constructing the tool-shank with the locking-groove running across the beveled surface, or parallel with it, and between said surface and the round portion of the shank, the strength of the shank is not materially impaired, and a width or breadth of groove is obtained for the reception of the locking device which insures the perfect retention of the tool.

The tool-shank is inserted in a tubular chuck or tool-holder, B, mounted in bearings in a casing or hand-piece, C. This tool-holder or chuck may be rotated in any suitable well-known way.

A locking-latch, *b*, provided with a hook or projection corresponding in outline with the locking-groove in the tool-shank, rocks on a pivot-pin, *b'*, passing through the chuck, so as swing freely transversely to the axis of the tool, the chuck or tool-holder being slotted for this purpose. A grooved thimble, collar, or sleeve, D, slides freely endwise on and rotates with the tool-holder or chuck, being provided with a cross-bar, *d*, working in guide-slots in the chuck, and acted upon by a spring, E, the tendency of which is to keep the thimble thrust over the joint at the junction of the latch and tool, thus keeping them securely locked.

To remove the tool, the thimble is retracted and the tool drawn out, the latch rising for that purpose. To insert the tool, the collar or thimble is drawn back, the tool-shank inserted in the chuck and turned until its bevel-face comes parallel to that of the latch, when the latter rises, and the tool can be shoved in until the projection on the latch comes opposite the recess in the shank, when the latch drops and the thimble is thrown forward by the spring, thus securely locking the parts together.

The collar or thimble can be retracted by inserting the nail of the operator through the slot *e* in the casing or hand-piece, or in any other well-known way.

I am aware that various forms of pivoted tool-locks have heretofore been suggested, some being pivoted on a non-rotating casing, and adapted to engage with a shoulder on the tool-shank, while others have been mounted on a rotary chuck; but I am not aware that, prior to my invention, a latch has been pivoted in a slot in a rotary chuck, so as to revolve therewith, in a hand piece or casing, in combination with a sliding controlling thimble or sleeve, also mounted on the chuck, which is a feature of great practical importance, and renders the pivoted lock superior to the spring, sliding, and other forms of locks proposed or suggested to be used.

I am also aware that operating-tools provided with a beveled or tapering driving end and with a locking-groove formed transversely or at right angles to the beveled driving-surface are old and well known, being shown and claimed in the Letters Patent of Nutz, dated June 2, 1874, and numbered 151,614.

My tool possesses advantages over those grooved transversely to the bevel portion, and can be more easily and cheaply manufactured.

I claim as my invention—

1. The combination, substantially as hereinbefore set forth, of the casing, the rotary chuck, the locking-latch pivoted in the chuck, so as to lock the operating-tools against withdrawal while in operation, and the thimble sliding endwise on the chuck and adapted to hold the pivoted latch in its locking position until retracted.

2. The combination, substantially as hereinbefore set forth, of the rotary chuck, the locking-latch pivoted in a slot therein, the thimble or sleeve sliding endwise on the chuck, and the spring, which normally keeps the thimble in its forward position, to prevent rocking of the latch and withdrawal of the tool.

3. The combination, substantially as hereinbefore set forth, of the casing provided with a slot, through which access is had to the tool-lock, the slotted socketed chuck revolving in bearings therein, the locking-latch pivoted in the chuck, the thimble sliding on the chuck, and the spring acting on the thimble.

4. The improved operating-tool constructed substantially as hereinbefore set forth, with the round shank, the beveled or tapering driving end or surface, and the cross-groove, or one parallel with the face of the driving-surface, and between the said surface and the round portion of the shank.

5. The combination, substantially as hereinbefore set forth, of a beveled-end tool provided with a cross-groove, or one parallel with the bevel portion of the tool, with a socketed holder provided with a locking latch or device acted upon by a spring and adapted to be operated for the release of the tool from said holder.

JOHN A. B. WILLIAMS.

Witnesses:
W. R. POTTER,
FRANK L. HISE.